(12) United States Patent
Dunstan (10) Patent No.: US 9,978,049 B2
(45) Date of Patent: May 22, 2018

(54) REMOTE CONFIGURATION OF A POINT-OF-SALE DEVICE

(71) Applicant: John Henry Dunstan, Caledon (CA)

(72) Inventor: John Henry Dunstan, Caledon (CA)

( * ) Notice: Subject to any disclaimer, the term of this patent is extended or adjusted under 35 U.S.C. 154(b) by 610 days.

(21) Appl. No.: 14/381,529

(22) PCT Filed: Feb. 28, 2013

(86) PCT No.: PCT/CA2013/000179
§ 371 (c)(1),
(2) Date: Aug. 27, 2014

(87) PCT Pub. No.: WO2013/126991
PCT Pub. Date: Sep. 6, 2013

(65) Prior Publication Data
US 2015/0025989 A1  Jan. 22, 2015

(30) Foreign Application Priority Data
Feb. 28, 2012 (CA) ...................... 2770652

(51) Int. Cl.
*G06Q 20/20* (2012.01)
*G07F 17/32* (2006.01)
*H04L 9/32* (2006.01)

(52) U.S. Cl.
CPC ........... *G06Q 20/206* (2013.01); *G06Q 20/20* (2013.01); *G07F 17/329* (2013.01)

(58) Field of Classification Search
USPC ........................................................ 705/18
See application file for complete search history.

(56) References Cited

U.S. PATENT DOCUMENTS 6,877,093 B1    4/2005  Desai et al.
2003/0222135 A1 12/2003 Stoutenburg et al.
(Continued)

FOREIGN PATENT DOCUMENTS

WO     2011032263 A1   3/2011

OTHER PUBLICATIONS

ISR Issued on PCT/CA2013/000179, dated May 22, 2013, 2 pages.
(Continued)

*Primary Examiner* — Garcia Ade
(74) *Attorney, Agent, or Firm* — Greenberg Traurig, LLP (57) ABSTRACT

A method of remotely configuring a point-of-sale device that is configured with resident executable program code involves the resident executable program code transmitting a framework update request to a computer server. The resident executable program code imposes a security requirement prohibiting unauthorized change of the resident executable program code. The resident executable program code also defines an operational framework of at least one allowed mode of operation for the point-of-sale device. The framework update request includes a credential. In accordance with a validity of the credential, the point-of-sale device receives a framework update payload in response to the framework update request, and installs the framework update payload into the point-of-sale device. The resident executable program code together with the framework update payload define an updated version of the operational framework. The updated version of the operational framework maintains the imposed security requirement.

18 Claims, 6 Drawing Sheets

(56) References Cited

U.S. PATENT DOCUMENTS

2009/0198803 A1\* 8/2009 Meckenstock ......... G06Q 20/20
709/221
2010/0050249 A1\* 2/2010 Newman ............... H04L 63/126
726/15

OTHER PUBLICATIONS

UnifiedPOS, Retail Peripheral Architecture, Version 1.14.1, International Standard for Implementation of Point of Service Peripherals, Oct. 23, 2014, 46 pgs.

\* cited by examiner

REMOTE CONFIGURATION OF A POINT-OF-SALE DEVICE

RELATED APPLICATIONS

This patent application claims the benefit of the filing date of Canadian Patent Application No. 2,770,652, entitled "Enhanced Multi-Mode Computing Peripheral Device", filed Feb. 28, 2012.

FIELD

This patent application relates to a method for configuring a computer peripheral device. In particular, this patent application describes a system and method for updating software on a point-of-sale device.

BACKGROUND

Some point-of-sale (POS) devices, such as POS peripherals (e.g. PINpads, POS printers, POS cash drawers, POS magnetic stripe readers, POS bar code scanners, and POS line displays), are typically connected to and under the control of an electronic cash register (ECR). Other POS devices are standalone POS terminals (e.g. payment terminals, EFT POS terminals) that are able to perform some actions (e.g. effect electronic payment) without an ECR. The Payment Card Industry (PCI) mandates that the executable program code resident on POS devices must be secured against unauthorised changes or substitution. This mandate is fulfilled, in part, by configuring the POS device to only accept updates to the resident executable program code from a local source, such as the electronic cash register. More importantly, however, this mandate is fulfilled by requiring the POS device to validate the source of the executable program code updates prior to accepting and installing the update. Typically, the originator of the executable program code will implement a cryptographic protection mechanism, such as digitally signing the update (using a symmetric or asymmetric key), and the POS device is configured to only accept the executable program code update if a cryptographic protection service implemented on the POS device is able to the executable program code update.

Although the executable program code updates mechanism satisfies the security requirements imposed by the PCI, the requirement for the updates to be digitally signed and installed from a local device renders such updates slow and cumbersome to be deployed, particularly when the updates originate from other than the manufacturer of the POS device or the acquirer that deploys/controls the POS device.

SUMMARY

By way of overview, this disclosure relates to a method of configuring a point-of-sale device. The first aspect of this disclosure also relates to a point-of-sale device, and a computer-readable medium having computer processing instructions stored thereon that implement the configuring method. As used herein, the terms "point of sale device" and "POS device" are intended to refer to both POS peripherals and standalone POS terminals.

The point-of-sale device is configured with resident executable program code that imposes a security requirement prohibiting unauthorized change of the resident executable program code. The resident executable program code also defines an operational framework of at least one allowed mode of operation for the point-of-sale device. The resident executable program code transmits a framework update request to a computer server. The framework update request comprise a credential.

In accordance with a validity of the credential, the point-of-sale device receives from the computer server a framework update payload in response to the framework update request, and installs the framework update payload into the point-of-sale device. The resident executable program code, together with the framework update payload, define an updated version of the operational framework. The updated version of the operational framework maintains the imposed security requirement.

The point-of-sale device comprises a memory storing computer program code, and a computer program processor in communication with the memory. The computer program code comprises resident executable program code that imposes a security requirement prohibiting unauthorized change of the resident executable program code. The resident executable program code also defines an operational framework of at least one allowed mode of operation for the point-of-sale device.

The resident executable program code, when executed by the computer program processor, configures the point-of-sale device to transmit to a computer server a framework update request that includes a credential, and in accordance with a validity of the credential install into the memory a framework update payload received from the computer server in response to the framework update request. The resident executable program code, together with the framework update payload, define an updated version of the operational framework. The updated version of the operational framework maintains the imposed security requirement.

In one implementation, the at least one allowed mode of operation permits the point-of-sale device to implement a first service on a first network, and the updated version of the operational framework defines for the point-of-sale device at least one additional mode of operation permitting the point-of-sale device to implement a second service on a second network. Preferably, the second service is permitted on the second network but is not permitted on the first network. The at least one additional mode of operation may comprise the point-of-sale device acting as an end node on the second network.

Preferably, the computer server is configured as gateway to the second network. In this implementation, the computer server provides the second network with the credential for a determination of the validity thereof, and transmits the framework update payload to the point-of-sale device in accordance with the outcome of the credential validity determination.

The second service may be defined by a set of business rules, the updated version of the operational framework may comprise business data and/or a transaction set, and the at least one additional mode of operation may comprise the point-of-sale device implementing the business rules using the business data and/or transaction set.

The POS device may implement a data source authentication mechanism for authenticating updates to the resident executable program code. However, preferably the resident executable program code installs the framework update payload without executing the data source authentication mechanism on the framework update payload.

The framework update request may comprise terminal data that is associated with the point-of-sale device. In this implementation, the computer server may generate the framework update payload in accordance with the terminal data, and transmit the generated framework update payload to the point-of-sale device.

BRIEF DESCRIPTION OF THE DRAWINGS

The foregoing aspects of this disclosure will now be described, by way of example, with reference to the accompanying drawings, in which.

DETAILED DESCRIPTION

POS Device Network—Overview

Figure 1:
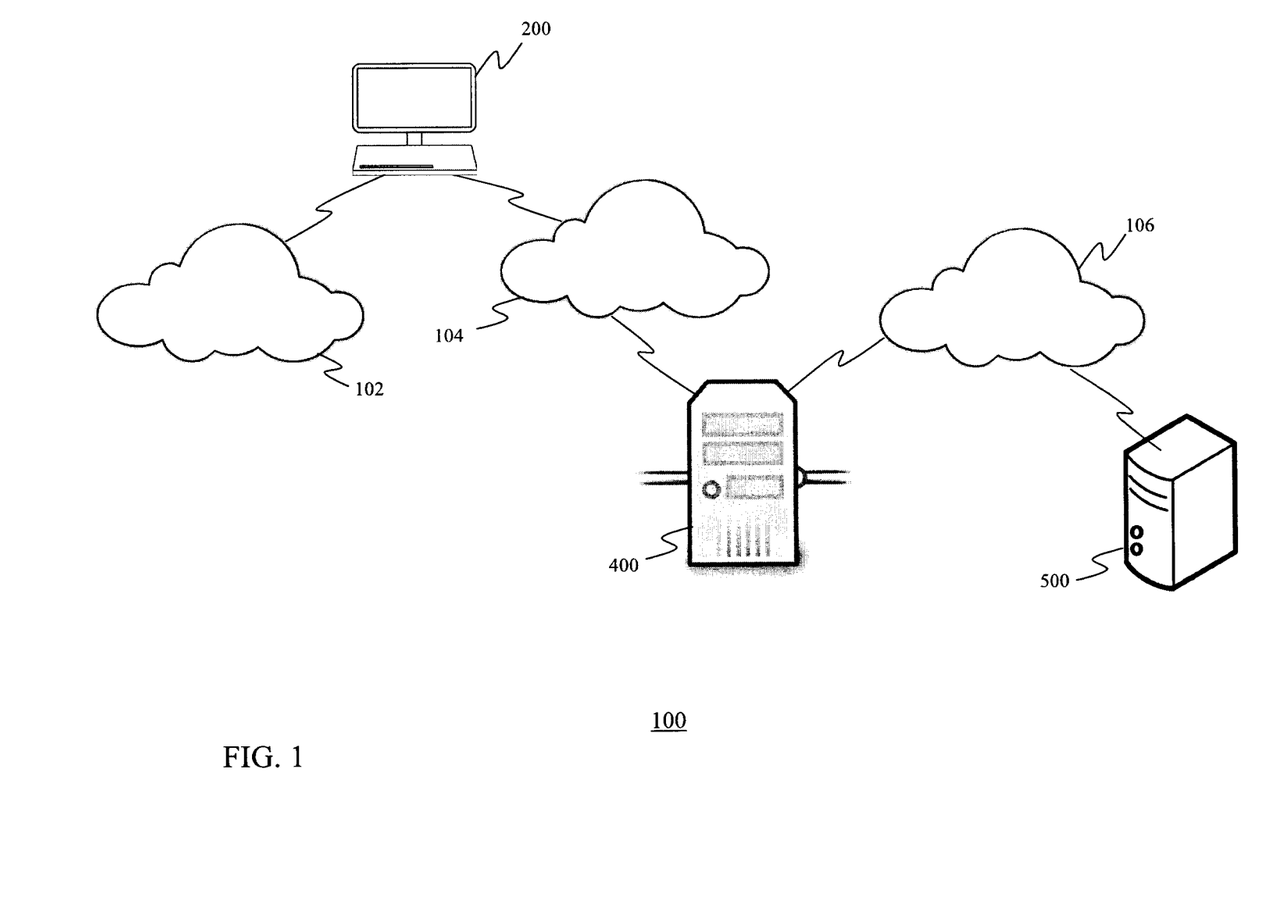
FIG. 1 is a block diagram that illustrates the various components of a POS device network.

Turning to FIG. 1, there is shown a point-of-sale (POS) device network, denoted generally by reference number 100, that includes a POS device 200 and a network gateway 400. Although the POS device network 100 is shown comprising only a single POS device 200, typically the POS device network 100 includes a plurality of the POS devices 200. Further, although the network gateway 400 is depicted as a monolithic network component, the functionality of the network gateway 400 may be split amongst multiple network components or servers.

The POS device 200 may be implemented as a stand-alone POS terminal, or as a POS peripheral that communicates with and is under control of an electronic cash register (ECR). As shown, the POS device 200 is configured to communicate with a secure payment network 102 to thereby effect payment for an electronic transaction. As non-limiting examples, the secure payment network 102 may comprise VisaNet, the MasterCard Network, and/or the merchant's payment card acquirer network. As used herein, an "electronic transaction" is any e-commerce or other electronic transaction (e.g. purchase of goods/services, bill payment, funds transfer, bank account or credit card balance query) that is provided by a network device. The POS device 200 will be discussed in further detail below.

The network gateway 400 may be implemented on one or more computer servers, and is configured to authenticate the POS device(s) 200 via the first sub-network 104, and optionally to authenticate the PUS device(s) 200 to a network device 500 of a second sub-network 106. The second sub-network 106 is distinct from the first sub-network 106 and the secure payment network 102, and typically comprises a packet-switched network.

POS Device

Figure 2:
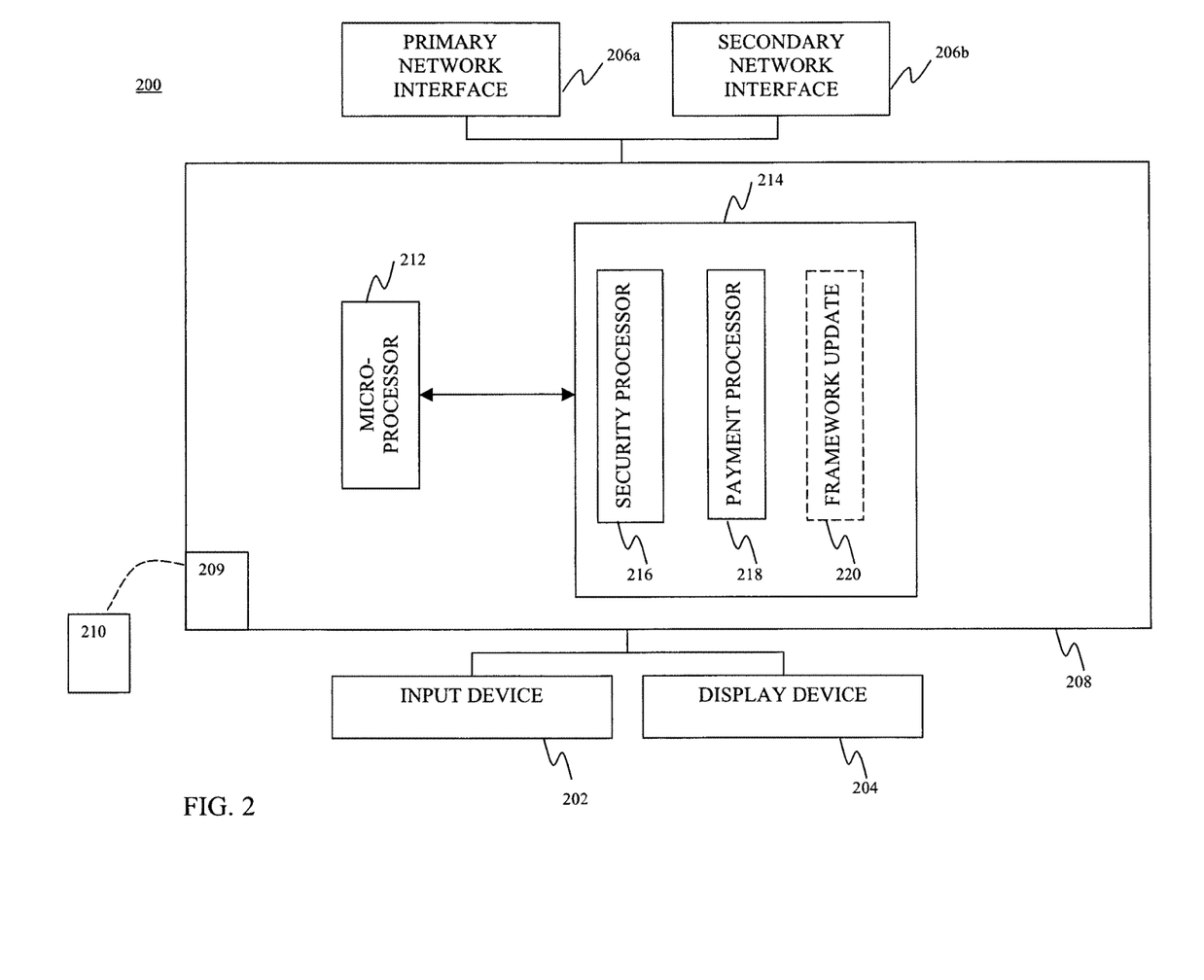
FIG. 2 is a schematic view of a POS device of the POS device network.

As shown in FIG. 2, the POS device 200 includes a user interface/input device 202, a display device 204, a first network interface 206a, a second network interface 206b, and a computer processing unit 208 that is coupled to the input device 202, the display device 204 and the network interfaces 206a, 206b. The POS device 200 may also include a contact/contactless token interface 209 that is coupled to the computer processing unit 208 and is configured to communicate with an identity token 210. The token interface 209 may be configured to communicate with the identity token 210 via a physical port (e.g. card reader) of the POS device 200.

The input device 202 may be implemented as a keyboard, touchpad, and/or touchscreen and/or other input device suitable for allowing an operator of the POS device 200 to input data and/or commands into the POS device 200. The display device 204 may comprise a liquid crystal display (LCD) panel, cathode ray tube (CRT) display, plasma display panel, and/or paper printer and/or other output device suitable for displaying information to the operator of the POS device 200.

The first network interface 206a interfaces the POS device 200 with the secure payment network 102. The second network interface 206b interfaces the POS device 200 with the first sub-network 104.

The computer processing unit 208 may include a microprocessor 212 and computer-readable medium 214. The computer-readable medium 214 may be provided as electronic computer memory (e.g. FLASH memory) that may persistently store one or more credentials ("terminal credentials") that are uniquely associated with the POS device 200. As non-limiting examples, the terminal credentials may comprise a terminal identifier (terminal ID) and/or a serial number of the POS device 200. The computer-readable medium 214 may also persistently store a digital certificate which allows the POS device 200 to establish a mutual encrypted communications channel with the network gateway 400.

The memory 214 also persistently stores computer processing instructions which, when executed by the microprocessor 212, define an operating system (not shown) that allows the POS device 200 to accept user input from the input device 202 and to control the display device 204 and the token interface 209. The computer processing instructions also comprise resident executable program code that defines an operational framework of at least one allowed mode of operation for the POS device 200. As an example, the allowed mode of operation may be electronic payment, in which case the resident executable program code may implement a payment processor 218 that allows a user of the POS device 200 to effect an electronic payment via the payment network 102.

Preferably, the resident executable program code also implements a security processor 216 that performs basic security functions for the POS device 200, including cryptographic services and the management of terminal credentials and digital certificates. The security processor 216 also manages updates to the operational framework by imposing a security requirement prohibiting unauthorized change of the resident executable program code. As mandated by the PCI, the resident executable program code can only be updated after the security processor 216 authenticates the source of the update. Accordingly, the security processor 216 is configured to only accept updates to the resident executable program code if the update is digitally signed and the security processor 216 is able to authenticate the digital signature on the update.

Identity Token

The identity token 210 typically comprises a self-contained integrated circuit device that includes a built-in micro-controller and protected memory. The micro-controller and protected memory together provide a secure self-contained computing environment that implements various cryptographic services for confidentiality, integrity and authentication (e.g. security mechanisms using encryption algorithms such as data encryption standard (DES), triple-DES, and advanced encryption standard (AES)). Typically, the protected memory is configured with a cryptographic key pair ("token cryptographic keys") and one or more credentials ("administrator credentials") that were uniquely assigned to the intended recipient of the identity token 210 by the issuer of the identity token 210. As non-limiting examples, the administrator credentials may comprise an administrator identifier ("sysID") and/or an administrator passcode.

Preferably, the administrator credentials and the token cryptographic keys are uniquely associated with the identity token 210, and the administrator credentials and the identity token 210 are provided by an entity associated with a network device 500 of the second sub-network 106. As will be discussed below, the administrator of the POS device 200 may then use the administrator credentials and the token cryptographic keys to authenticate the POS device 200 to the network device 500 of the second sub-network 106.

Network Gateway

The network gateway 400 is implemented as one or more networked computer servers. Therefore, the network gateway 400 includes a computer-readable medium and a computer program processor in communication with the computer-readable medium. The computer-readable medium is configured with a private cryptographic key and an associated gateway authentication certificate which the network gateway 400 can use for authenticating to the second sub-network 106. The computer-readable medium is also configured with computer program code which, when executed by the computer program processor configures the network gateway to receive from a POS device 200 a framework update request that includes a credential, and in accordance with a validity of the credential to transmit to the POS device 200 a framework update payload in response to the framework update request.

Typically, the administrator credentials and the identity token 210 are provided by an entity that is associated with a network device 500 of the second sub-network 106. Accordingly, if the network gateway 400 receives an administrator credential from one of the POS devices 200 during the framework update process, the network gateway 400 facilitates authentication of the POS device 200 to the network device 500 by forwarding the administrator credential to the network device 500.

However, in one variation, after the POS device 200 authenticates to the network device 500, the network gateway 400 receives and saves a credential specified by the administrator of the POS device 200. As a result, if the network gateway 400 subsequently receives the administrator-specified credential from one of the POS devices 200 during the framework update process, the network gateway 400 may use the administrator-specified credential to authenticate the POS device 200.

Operational Framework Update Processing—Overview

Figure 3:
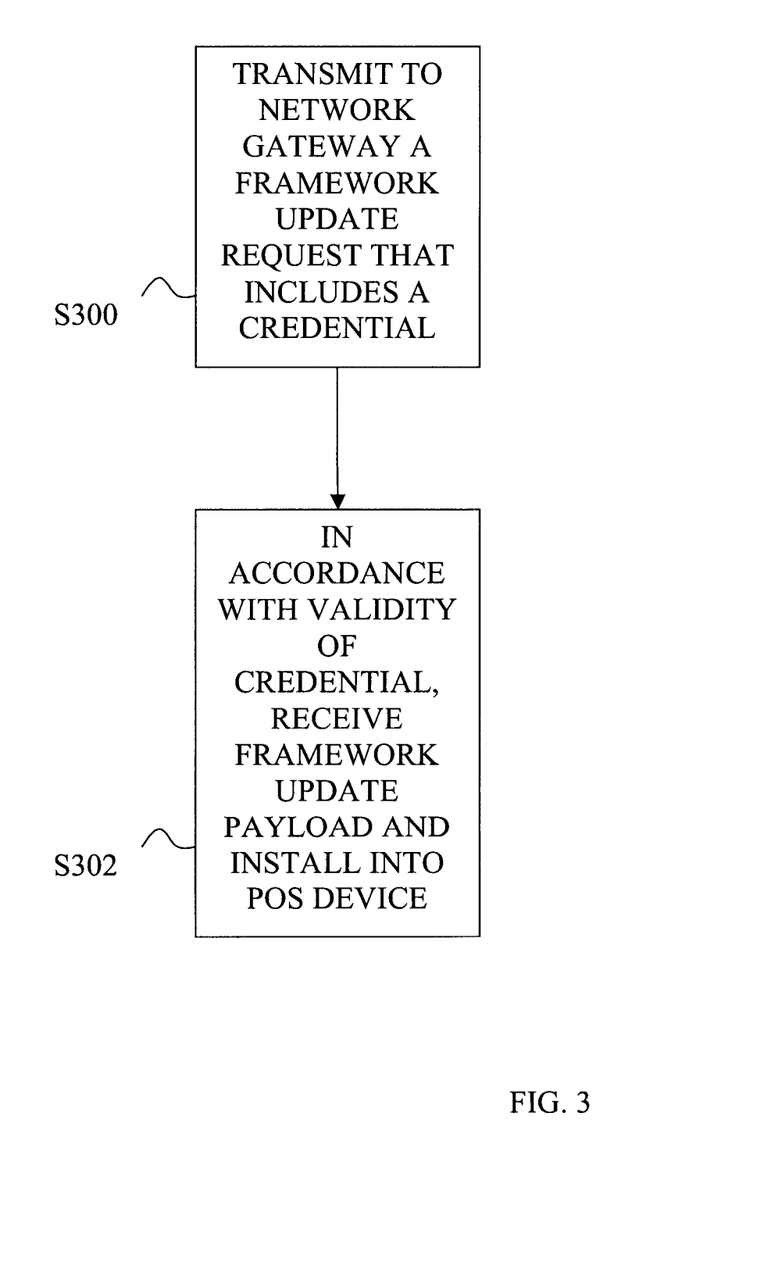
FIG. 3 is a flow chart that depicts, by way of overview, the framework update method, as implemented at the POS device.

As discussed, the POS device 200 is configured with resident executable program code that imposes a security requirement prohibiting unauthorized change of the resident executable program code. The resident executable program code also defines the operational framework of at least one allowed mode of operation for the POS device 200. The POS device 200 also implements a method of remotely updating the operational framework of the POS devices 200. A sample embodiment of the framework update method, as implemented at the POS device 200, is depicted in FIG. 3.

As shown therein, at step S300 the security processor 216 of the POS device 200 transmits a framework update request to the network gateway 400 via the first sub-network 104. The framework update request includes a credential, and requests an update to the operational framework of the POS device 200.

At step S302, in accordance with the validity of the credential, the security processor 216 of the POS device 200 receives from the network gateway 400 a framework update payload in response to the framework update request, and installs the framework update payload into the memory 214 of the POS device 200. The credential may have been previously provided to the administrator of the POS device 200 by an entity that is associated with a network device 500 of the second sub-network 106 (e.g. sysID), in which case the network gateway 400 may forward the credential to the network device 500 for determination of the validity of the credential. Alternately, the credential may have been previously provided to the network gateway 400 by the administrator of the POS device 200, in which case the network gateway 400 may determine the validity of the credential.

The executable program code resident on the POS device 200 (e.g. the security processor 216 and the payment processor 218), together with the framework update payload 220, define an updated version of the operational framework. However, the updated version of the operational framework maintains the imposed security requirement (i.e. the security requirement prohibiting unauthorized change of the resident executable program code).

The framework update payload 220 may update one or more of the existing modes of operation of the POS device 200. Alternately, the updated operational framework may include at least one additional mode of operation for the POS device 200. As an example, the framework update payload 220 may configure the POS device 200 to act as an end node on the second sub-network 106.

As another example, the additional mode of operation may be the implementation of a service that is permitted on the second sub-network 106 but which is not permitted on the secure payment network 102. In this variation, the framework update payload 220 may configure the POS device 200 to implement the second service on the second sub-network 106 (via first sub-network 104 and the network gateway 400). The second service may be defined by a set of business rules, and the updated operational framework may include business data and/or at least one new/updated transaction set. The framework update payload 220 may be provided as a "product catalogue" that comprises images and business documents that include the business data required for the POS device 200 to process events (e.g. user selections, cancellations, corrections) with the various states of the business tasks. The POS device 200 may implement the business rules of the second service using the business data and the transaction set(s).

Since the framework update payload 220 is installed into the POS device 200 under the control of the security processor 216, the framework update method satisfies the security requirements imposed by the PCI. However, since the framework update payload 220 is downloaded to the POS device 200 from a remote network location in real-time or substantially-real time, the operational framework can be updated more rapidly than with the prior art framework update mechanism.

The operating system typically implements a data source authentication mechanism that authenticates updates to the resident executable program code prior to the security processor 216 accepting and installing the updates in the POS device 200. However, preferably the security processor 216 installs the framework update payload 220 without executing the data source authentication mechanism on the framework update payload 220. This variation would allow the framework update payload 220 to be deployed unsigned, thereby further increasing the speed with which the operational framework can be updated.

Operational Framework Update Request Processing—Overview

Figure 4:
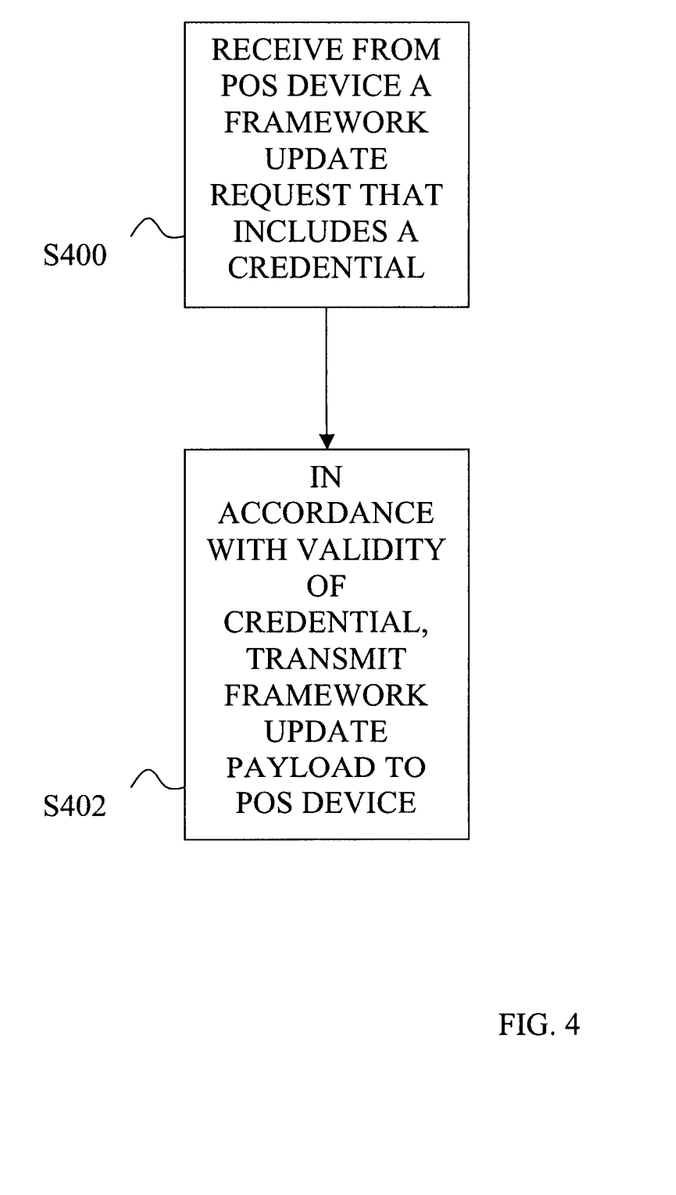
FIG. 4 is a flow chart that depicts, by way of overview, the framework update method, as implemented at the network gateway.

The network gateway 400 also facilitates the remote updating of the operational framework of the POS devices 200. A sample embodiment of the framework update method, as implemented as the network gateway 400, is depicted in FIG. 4.

As shown therein, at step S400 the network gateway 400 receives a framework update request from a POS device 200. The framework update request includes a credential (e.g. a credential specified by an administrator of a network device 500 of the second sub-network 106 (e.g. sysID), or an administrator-specified credential).

At step S402, in accordance with the validity of the credential, the network gateway 400 transmits a framework update payload to the POS device 200 in response to the framework update request. As discussed, the network gateway 400 may determine the validity of the credential, or may forward the credential to the network device 500 for determination of the validity thereof.

The security processor 216 on the POS device 200 is configured to install the framework update payload into the POS device 200. The resident executable program code, together with the framework update payload, define an updated version of the operational framework. The updated version of the operational framework may update one or more of the existing modes of operation of the POS device 200, or may define at least one additional mode of operation for the POS device 200. However, the updated version of the operational framework maintains the security requirement imposed on the resident executable code (i.e. the security requirement prohibiting unauthorized change of the resident executable program code).

The network gateway 400 may be configured with a plurality of framework update payloads, and/or a plurality of framework software modules that can be used to generate framework update payloads. In this variation, the framework update request may include terminal data that is associated with the POS device 200 and/or the operator of the POS device 200, and the network gateway 400 may generate the framework update payloads in accordance with the received terminal data. As a result, each framework update payload can be configured for the hardware requirements/capabilities of the different POS device 200 and any business rules imposed on the existing or additional mode(s) of operation of the POS device 200.

Operational Framework Update Request Processing—Implementation #1

Figure 5:
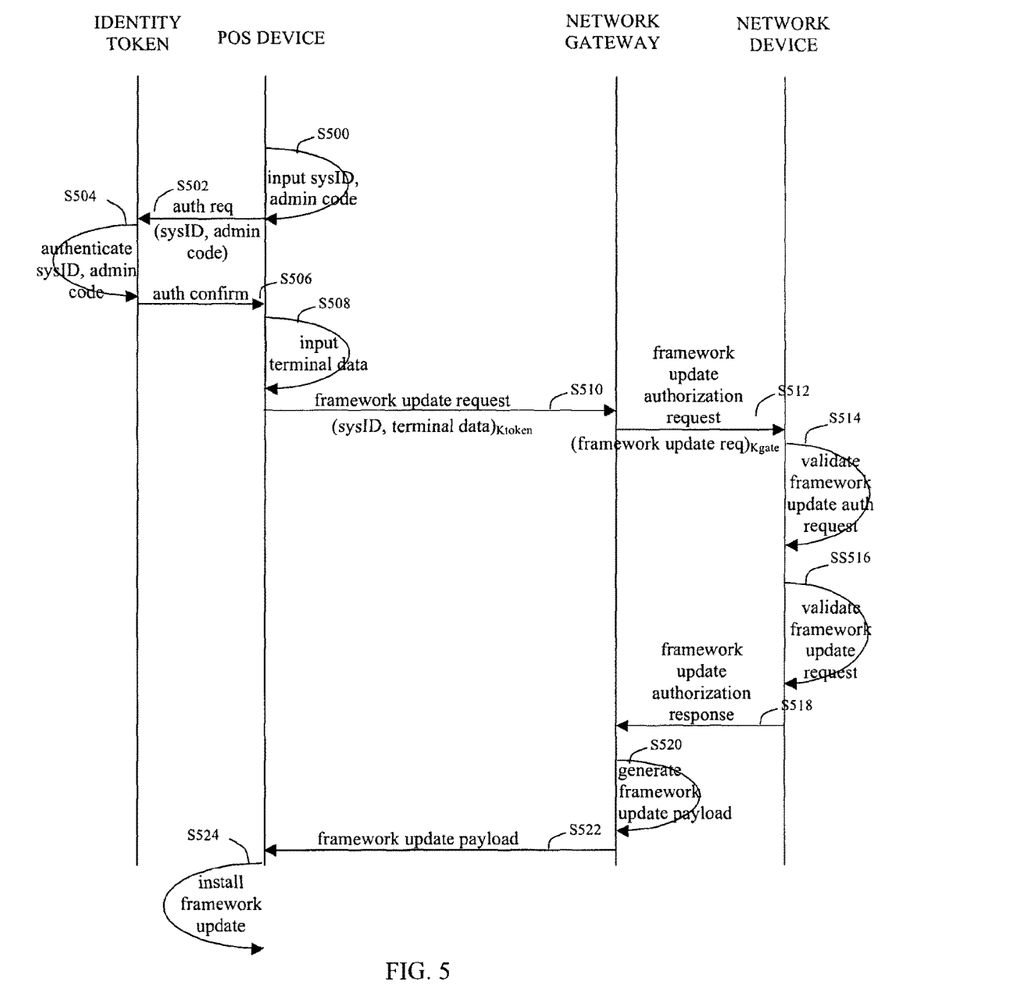
FIG. 5 is a detailed message flow diagram that depicts a sample implementation of the framework update method implemented by the POS device network.

One implementation of the framework update method will now be discussed with reference to FIG. 5. In this implementation, the administrator of a network device 500 of the second sub-network 106 wishes to deliver a new network service to the POS devices 200 (or update an existing network service) via the first sub-network 104 and the second sub-network 106. The new/updated network service is permitted on the second sub-network 106. However, due to the restrictions imposed on the POS devices 200 by the operational framework, the new/updated network service is not permitted on the secure payment network 102.

To that end, the administrators of the POS devices 200 are each supplied with a unique set of administrator credentials (sysID and administrator passcode), and an associated identity token 210. Each identity token 210 is configured with the associated administrator credentials and a unique token cryptographic public/private key pair. The network gateway 400 is configured with a private cryptographic key and an associated gateway authentication certificate that the network gateway 400 can use to authenticate to the second sub-network 106. The network device 500 is implemented as a computer server, and is in communication with a token database that saves each set of administrator credentials together with the public key of the associated token cryptographic key pair. The database may also save the administrator credentials together with the terminal credentials of the administrator's POS devices 200.

To initiate an update to the operational framework of the POS device, preferably the administrator of the POS device 200 first authenticates to the POS device 200. To do so, the administrator uses the data input device 202 to access a security administration menu displayed on the POS device 200, interfaces the supplied identity token 210 with the token interface 209, and inputs one or more of the administrator credentials (e.g. sysID, administrator passcode) into the POS device 200 via the data input device 202, at step S500. In response, the security processor 216 generates an authentication request message that includes the administrator credential(s), and transmits the authentication request message to the identity token 210, at step S502.

At step S504, the identity token 210 whether the received administrator credentials match the administrator credentials that are saved in the protected memory of the identity token 210. If the received administrator credentials match the stored administrator credentials, the identity token 210 generates authentication confirmation message that includes the token cryptographic key pair, and transmits the authentication confirmation message to the POS device 200.

Upon receipt of the authentication confirmation message, the security processor 216 notifies the administrator of the POS device 200 that the administrator's identity was successfully authenticated, and saves the token cryptographic key pair in the memory 214. The security processor 216 then allows the administrator of the POS device 200 to use the data input device 202 to access a framework update menu displayed on the POS device 200.

Upon selection of the framework update menu, the security processor 216 may optionally prompt the administrator of the POS device 200 to provide terminal data associated with the POS device 200. Examples of terminal data include configuration parameters and contract parameters. The configuration parameters might specify, for example, the make, model, display type and/or display size of the POS device 200. The contract parameters might specify, for example, whether the POS device 200 is located in a pre-pay lane, a self serve lane or an express lane, and/or identify the permitted operating modes of the POS device 200.

The administrator uses the data input device 202 to input the terminal data into the POS device 200, at step S508. The security processor 216 then generates a framework update request message that includes the specified terminal data and the administrator sysID credential and optionally one or more of the terminal credentials, and signs the framework update request message with the private key of the token cryptographic key pair. Since the framework update request message is cryptographically signed, the signed framework update request message therefore comprises a cryptographic token. The security processor 216 uses the terminal digital certificate assigned to the POS device 200 to establish an encrypted channel with the network gateway 400, and transmits the signed framework update request message to the network gateway 400 over the encrypted channel, at step S510.

The network gateway 400 generates a framework update authorization request message that includes the signed framework update request message, digitally signs the framework update authorization request message using the private cryptographic key associated with gateway authentication certificate of the network gateway 400, and transmits the signed framework update authorization request message to the network device 500 over the second sub-network 106, at step S512.

At step S514, the network device 500 authenticates the network gateway 400 by using the gateway authentication certificate assigned to the network gateway 400 to validate the signed framework update authorization request message. If the network device 500 determines that the network gateway 400 signed the framework update authorization request message, the network gateway 400 is considered to have been authenticated.

The network device 500 then determines the validity of the administrator sysID credential that was included in the signed framework update request message. To do so, the network device 500 uses the administrator sysID credential to locate the public cryptographic key that is associated with the identity token 210. At step S516, the network device 500 uses the located cryptographic key to decrypt the cryptographic token and thereby validate the signed framework update request message. If the network device 500 determines that the framework update request message was signed using the private key assigned to the identity token 210, and optionally the network device 500 had previously associated the administrator sysID credential with the terminal credentials included in the framework update request message, the administrator sysID credential (and optionally the terminal credentials) is/are considered to have been validated and the POS device 200 is considered to have authenticated to the network device 500.

The network device 500 then generates a framework update authorization response message that indicates that the POS device 200 is authorized to receive a framework update payload 220 from the network gateway 400. The network device 500 transmits the framework update authorization response message to the network gateway 400, at step S518.

In response, the network gateway 400 generates a framework update payload 220 for the POS device 200, at step S520. In this example, the framework update payload 220 configures the POS device 200 with a new operational mode, or updates an existing operational mode, to thereby allow the POS device 200 to receive the aforementioned new/updated network service via the first sub-network 104 and the second sub-network 106. The network service may be defined by a set of business rules, in which case the framework update payload 220 may comprise business data and/or a transaction set for implementing the business rules of the network service on the POS device 200. The new/updated operational mode may be provided as XML instructions, although the implementation of the framework update payload 220 is not limited to any particular language.

The framework update payload 220 may have been generated in advance of the framework update request message, for example as a global deployment or update for all the POS device 200. Alternately, as discussed, the network gateway 400 may be configured with a plurality of framework update payloads 220, and/or a plurality of framework software modules that can be used to generate framework update payloads 220. If the framework update request message includes terminal data associated with the POS device 200, the network gateway 400 may generate the framework update payload 220 based on the requirements specified in the terminal data. The network gateway 400 transmits the framework update payload 220 to the POS device 200, in response to the framework update request message, at step S522.

The security processor 216 installs the framework update payload 220 into the memory 214 of the POS device 200, at step S524. As discussed, the operating system typically implements a data source authentication mechanism that authenticates updates to the resident executable program code prior to the security processor 216 accepting and installing the updates in the POS device 200. However, preferably the security processor 216 installs the framework update payload 220 without executing the data source authentication mechanism on the framework update payload 220.

Operational Framework Update Request Processing—Implementation #2

Figure 6:
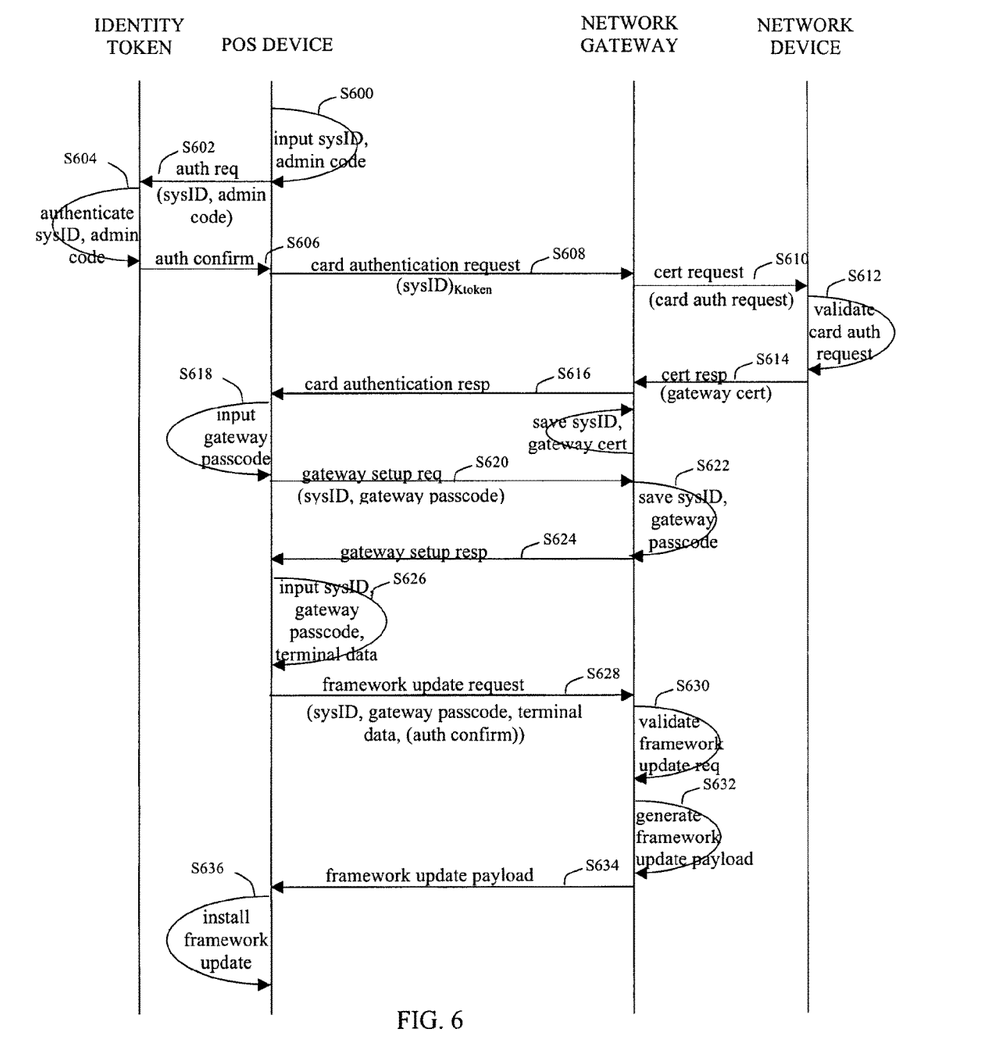
FIG. 6 is a detailed message flow diagram that depicts another sample implementation of the framework update method implemented by the POS device network.

Another implementation of the framework update method will now be discussed with reference to FIG. 6. In this second implementation, the administrators of the POS devices 200 are again each supplied with a unique set of administrator credentials (sysID and administrator passcode), and an identity token 210 configured with the administrator credentials and a unique token cryptographic public/private key pair. The network device 500 is in communication with a token database that saves each set of administrator credentials together with the public key of the associated token cryptographic key pair. The database may also save the administrator credentials together with the terminal credentials of the administrator's POS devices 200. However, in contrast to the previous implementation, the network gateway 400 is not configured with a private cryptographic key and an associated gateway authentication certificate.

Steps S600 to S606 are the same as steps S500 to S506, except that, upon receipt of the authentication confirmation message from the identity token 210, the security processor 216 allows the administrator of the POS device 200 to use the data input device 202 to access a gateway setup menu displayed on the POS device 200. Upon selection of the gateway setup menu, the security processor 216 generates a card authentication request message that includes the administrator sysID credential and optionally one or more of the terminal credentials, and signs the card authentication request message with the private key of the token cryptographic key pair. Since the card authentication request message is cryptographically signed, the card authentication request message therefore comprises a cryptographic token. The security processor 216 also uses the terminal digital certificate assigned to the POS device 200 to establish an encrypted channel with the network gateway 400, and transmits the signed card authentication request message to the network gateway 400 over the encrypted channel, at step S608.

The gateway network gateway 400 generates a certificate request message that includes the administrator sysID credential and the signed card authentication request message, and transmits the certificate request message to the network device 500 of the second sub-network, at step S610.

The network device 500 then determines the validity of the administrator sysID credential that was included in the signed certificate request message. To do so, the network device 500 uses the administrator sysID credential to locate the public cryptographic key that is associated with the identity token 210, and then uses the located cryptographic key to decrypt the cryptographic token and thereby validate the signed card authentication request message, at step S612. If the network device 500 determines that the card authentication request message was signed using the private key assigned to the identity token 210, and optionally the network device 500 had previously associated the administrator sysID credential with the terminal credentials included in the certificate request message, the administrator sysID credential (and optionally the terminal credentials) is/are considered to have been validated and the POS device 200 is considered to have authenticated to the network device 500.

The network device 500 then generates a certificate response message that includes a gateway authentication certificate that the network gateway 400 can use to authenticate to the network device 500. The network device 500 transmits the certificate response message to the network gateway 400, at step S614. Preferably, the network gateway 400 saves the gateway authentication certificate, together with the administrator sysID credential. The network gateway 400 then generates a card authentication response, confirming the validity of the card authentication request message, and transmits the card authentication response to the POS device 200, at step S616.

The network gateway 400 then prompts the administrator of the POS device 200 to input a new administrator-supplied credential (e.g. a gateway passcode) which the administrator would like to use to authenticate the POS device 200 to the network gateway 400. The administrator inputs the administrator-supplied credential (gateway passcode) into the POS device 200, at step S618. In response, the security processor 216 generates a gateway setup request message that includes the administrator sysID credential and the gateway passcode, and transmits the gateway setup request to the network gateway 400, at step S620.

The network gateway 400 confirms that it had previously associated the administrator sysID credential with the gateway authentication certificate, and then associates the gateway passcode with the gateway authentication certificate, at step S622. The network gateway 400 then generates a gateway setup response message, confirming successful establishment of the gateway passcode, and transmits the gateway setup response message to the POS device 200, at step S624. The administrator of the POS device 200 may then remove the identity token 210 from the POS device 200.

To initiate an update to the operational framework of the POS device, the administrator of the POS device 200 uses the data input device 202 to access a framework update menu displayed on the POS device 200. Upon selection of the framework update menu, the security processor 216 prompts the administrator of the POS device 200 to input the administrator sysID credential and the administrator-supplied credential (gateway passcode) into the POS device 200. The security processor 216 may optionally also prompt the administrator of the POS device 200 to input the terminal data into the POS device 200.

The administrator of the POS device 200 inputs the administrator sysID credential, the gateway passcode and optionally the terminal data into the POS device 200 via the data input device 202, at step S626. The security processor 216 then generates a framework update request message that includes the administrator sysID credential and the gateway passcode and optionally the terminal data and optionally one or more of the terminal credentials. Optionally, the security processor 216 may sign the framework update request message with the private key of the token cryptographic key pair. The security processor 216 uses the terminal digital certificate assigned to the POS device 200 to establish an encrypted channel with the network gateway 400, and transmits the (signed) framework update request message to the network gateway 400 over the encrypted channel, at step S628.

If the security processor 216 signed the framework update request message, the network gateway 400 may generate a framework update authorization request message that includes the signed framework update request message, and forward the framework update authorization request message to the network device 500, for authentication of the administrator sysID credential and optionally the terminal credentials, as discussed above with reference to steps S512 to S518. Instead, however, preferably the framework update request message is unsigned, and the network gateway 400 determines the validity of the administrator sysID credential, at step S630, by confirming that it had associated the administrator sysID credential and the gateway passcode with the same gateway authentication certificate.

Steps S632 to S636 correspond to steps S520 to S524. After authenticating the administrator sysID credential (whether indirectly via the network device 500, or directly via the administrator sysID credential and the gateway passcode), the network gateway 400 generates a framework update payload 220 for the POS device 200, at step S632. The network gateway 400 transmits the framework update payload 220 to the POS device 200, in response to the framework update request message, at step S634. The security processor 216 installs the framework update payload 220 into the memory 214 of the POS device 200, at step S636.

Independently of the mode of its deployment to the POS device 200, the framework update payload 220, when executed by the computer processing unit 208, defines the new/updated operational mode for the POS device 200. Where the new/updated operational mode comprises a new/updated network service, and the framework update payload 220 comprises business data and/or a transaction set for implementing the business rules of the network service, the POS device 200 implements the business rules of the network service using the business data and/or transaction set. Therefore, the executable program code resident on the POS device 200, together with the framework update payload 220, define the updated operational framework of the POS device 200.

However, the security processor 216 installs the framework update payload 220 into the memory 214 such that the updated operational framework maintains the aforementioned security requirement imposed on the resident executable program code. Therefore, even if the operational framework is updated, the resident executable program code cannot be updated or changed without the security processor 216 first authenticating the source of the update. As a result, the framework update payload 220 allows the operational framework of the POS device 200 to be updated from a remote network location, and new modes of operation added (or existing modes of operation modified) without impeding or modifying those modes of operation that are implemented by the resident executable program code.

The invention claimed is:

1. A method of remotely configuring a point-of-sale peripheral, the point-of-sale peripheral being configured with resident executable program code, the resident executable program code imposing a security requirement prohibiting unauthorized change of the resident executable program code, the method comprising:

the resident executable program code receiving a signed executable program code update, validating a source of the signed executable program code update, and updating the resident executable program code with the signed executable program code update, the updated resident executable program code defining an operational framework of at least one allowed mode of operation for the point-of-sale peripheral;

the updated resident executable program code transmitting a credential to a token interfaced with the point-of-sale peripheral and, in response to the token confirming that the credential matches a datum stored on the token, the point-of-sale peripheral receiving from the token a cryptographic key stored on the token;

the updated resident executable program code generating a framework update request, digitally signing the framework update request with the cryptographic key, and transmitting the signed framework update request to a network gateway via a first network, the framework update request including the credential;

the network gateway transmitting the signed framework update request to a network device via a second network distinct from the first network, and receiving from the network device via the second network a confirmation that the signed framework update request was digitally signed with a cryptographic key that the network device had associated with the credential and with the token prior to the network gateway receiving the signed framework update request;

the network gateway transmitting to the point-of-sale peripheral via the first network an unsigned framework update payload in response to the framework update request; and the updated resident executable program code installing the unsigned framework update payload into the point-of-sale peripheral;

wherein the updated resident executable program code together with the unsigned framework update payload define an updated version of the operational framework, the updated version of the operational framework maintaining the imposed security requirement.

2. The method according to claim 1, wherein the at least one allowed mode of operation permits the point-of-sale peripheral to implement a first service on the first network, and the updated version of the operational framework defines for the point-of-sale peripheral at least one additional mode of operation permitting the point-of-sale peripheral to implement a second service on the second network, the second service being permitted on the second network but not on the first network.

3. The method according to claim 2, wherein the at least one additional mode of operation comprises the point-of-sale peripheral acting as an end node on the second network.

4. The method according to claim 2, wherein the second service is defined by a set of business rules, the updated version of the operational framework comprises at least one of business data and a transaction set, and the at least one additional mode of operation comprises the point-of-sale peripheral implementing the business rules using the at least one business data and transaction set.

5. The method according to claim 1, wherein the updated resident executable program code implements a data source authentication mechanism, and the installing the framework update payload comprises the updated resident executable program code installing the framework update payload without executing the data source authentication mechanism on the framework update payload.

6. The method according to claim 1, wherein the framework update request comprises terminal data associated with the point-of-sale peripheral, and the transmitting a framework update payload comprises the network gateway generating the framework update payload in accordance with the terminal data and transmitting the generated framework update payload to the point-of-sale peripheral.

7. A point-of-sale peripheral, comprising:

a memory storing computer program code, the computer program code comprising resident executable program code imposing a security requirement prohibiting unauthorized change of the resident executable program code; and a computer program processor in communication with the memory, the resident executable program code when executed by the computer program processor configuring the point-of-sale peripheral to receive a signed executable program code update, validate a source of the signed executable program code update, and update the resident executable program code with the signed executable program code update, the updated resident executable program code defining an operational framework of at least one allowed mode of operation for the point-of-sale peripheral, the updated resident executable program code when executed by the computer program processor configuring the point-of-sale peripheral to:

(i) transmit a credential to a token interfaced with the point-of-sale peripheral and, in response to the token confirming that the credential matches a datum stored on the token, receive from the token a cryptographic key stored on the token;

(ii) generate a framework update request, digitally sign the framework update request with the cryptographic key, and transmit the signed framework update request to a computer server via a first network, the framework update request including the credential;

(iii) receive from the computer server via the first network the framework update payload in response to the framework update request, the computer server being configured to provide the point-of-sale peripheral with the framework update payload in response to the computer server receive from a network device via a second network a confirmation that the signed framework update request was digitally signed with the cryptographic key and that the network device had associated the credential with the cryptographic key prior to the computer server receiving the signed framework update request, the second network being distinct from the first network; and (iv) install into the memory the framework update payload received from the computer server, the updated resident executable program code together with the framework update payload defining an updated version of the operational framework, the updated version of the operational framework maintaining the imposed security requirement.

8. The point-of-sale peripheral according to claim 7, wherein the at least one allowed mode of operation permits the point-of-sale peripheral to implement a first service on the first network, and the updated version of the operational framework defines for the point-of-sale peripheral at least one additional mode of operation permitting the point-of-sale peripheral to implement a second service on the second network, the second service being permitted on the second network but not on the first network.

9. The point-of-sale peripheral according to claim 8, wherein the at least one additional mode of operation comprises the point-of-sale peripheral acting as an end node on the second network.

10. The point-of-sale peripheral according to claim 8, wherein the second service is defined by a set of business rules, the updated version of the operational framework comprises at least one of business data and a transaction set, and the point-of-sale peripheral is configured to implement the business rules for the second service using the at least one business data and transaction set.

11. The point-of-sale peripheral according to claim 7, the updated resident executable program code is configured to implement a data source authentication mechanism, and to install the framework update payload into the memory without executing the data source authentication mechanism on the framework update payload.

12. A network gateway comprising:
a memory storing computer program code; and
a computer program processor in communication with the memory, the program code when executed by the computer program processor configuring the network gateway to
(i) receive a signed framework update request from a point-of-sale peripheral via a first network, the point-of-sale peripheral being configured with resident executable program code, the resident executable program code imposing a security requirement prohibiting unauthorized change of the resident executable program code, the resident executable program code defining an operational framework of at least one allowed mode of operation for the point-of-sale peripheral, the framework update request including a credential;
(ii) transmit the signed framework update request to a network device via a second network distinct from the first network, and receive from the network device via the second network a confirmation that the signed framework update request was digitally signed with a cryptographic key that the network device had associated with the credential and with a token prior to the network gateway receiving the signed framework update request, the token being configured with the cryptographic key and being configured to transmit the cryptographic key to the point-of-sale peripheral in response to receiving the credential from the point-of-sale peripheral; and
(iii) transmit to the point-of-sale peripheral via the first network the framework update payload in response to the framework update request,
wherein the resident executable program code is configured to install the framework update payload into the point-of-sale peripheral, the resident executable program code together with the framework update payload define an updated version of the operational framework, the updated version of the operational framework maintaining the imposed security requirement.

13. The point-of-sale peripheral according to claim 7, wherein the framework update request comprises terminal data associated with the point-of-sale peripheral, and program code when configures the point-of-sale peripheral to generate the framework update payload in accordance with the terminal data.

14. The method according to claim 1, wherein the framework update request comprises terminal data associated with the point-of-sale peripheral, and the network gateway transmitting the framework update payload comprises the network gateway generating the framework update payload in accordance with on the terminal data.

15. The network gateway according to claim 12, wherein the framework update request comprises terminal data associated with the point-of-sale peripheral, and the program code configures the network gateway to generate the framework update payload in accordance with on the terminal data.

16. The point-of-sale peripheral according to claim 13, wherein the terminal data comprises at least one of lane type and permitted operating mode.

17. The method according to claim 14, wherein the terminal data comprises at least one of lane type and permitted operating mode.

18. The network gateway according to claim 15, wherein the terminal data comprises at least one of lane type and permitted operating mode.

* * * * *